(12) United States Patent
Makimura et al.

(10) Patent No.: US 10,288,165 B2
(45) Date of Patent: May 14, 2019

(54) SHIFT DEVICE

(71) Applicant: KABUSHIKI KAISHA TOKAI-RIKA-DENKI-SEISAKUSHO, Aichi (JP)

(72) Inventors: Munetoshi Makimura, Aichi (JP); Atsushi Ishida, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 363 days.

(21) Appl. No.: 15/230,051

(22) Filed: Aug. 5, 2016

(65) Prior Publication Data

US 2017/0059034 A1    Mar. 2, 2017

(30) Foreign Application Priority Data

Aug. 27, 2015 (JP) ................. 2015-168237

(51) Int. Cl.
| F16H 59/02 | (2006.01) |
| F16H 61/22 | (2006.01) |
| F16H 59/10 | (2006.01) |
| F16H 61/24 | (2006.01) |

(52) U.S. Cl.
CPC ......... F16H 59/0204 (2013.01); F16H 59/10 (2013.01); F16H 61/22 (2013.01); F16H 61/24 (2013.01); F16H 2059/0295 (2013.01); F16H 2061/243 (2013.01)

(58) Field of Classification Search
CPC ......... F16H 63/3466; F16H 2059/0282; F16H 2061/223; F16H 63/3416; F16H 2059/0295; F16H 2025/2068
See application file for complete search history.

(56) References Cited

U.S. PATENT DOCUMENTS

| 7,832,302 B2 * | 11/2010 | Wang ............... F16H 59/10 74/473.23 |
| 8,485,061 B2 | 7/2013 | Kliemannel et al. |
| 9,091,340 B2 * | 7/2015 | Wang ............... F16H 59/10 |
| 2007/0034041 A1 * | 2/2007 | Dominguis Botella .......... F16H 59/044 74/523 |

FOREIGN PATENT DOCUMENTS

JP   2010522116 A   7/2010

* cited by examiner

Primary Examiner — William Kelleher
Assistant Examiner — Gregory T Prather
(74) Attorney, Agent, or Firm — Roberts Mlotkowski Safran Cole & Calderon, P.C.

(57) ABSTRACT

A shift device, including: a shift body that is operated to change a shift position thereof; a biasing section that causes biasing force to act on the shift body; a retention track that, by placement of the biasing section thereon, causes the shift body to be retained at a shift position; a release track that, by movement of the biasing section thereon from the retention track, causes retention of the shift body at a shift position to be released; and a changer section that, after the biasing section has been moved from the retention track to the release track and moved along the release track, causes the biasing section to be moved from the release track onto the retention track and a shift position of the shift body to be changed by moving the biasing section at a specific occasion.

10 Claims, 9 Drawing Sheets

SHIFT DEVICE

CROSS-REFERENCE TO RELATED APPLICATION

This application is based on and claims priority under 35 USC 119 from Japanese Patent Application No. 2015-168237 filed on Aug. 27, 2015, the disclosure of which is incorporated by reference herein.

BACKGROUND

Technical Field

The preferred embodiments relate to a shift device that changes a shift position of a shift body using a changer means.

Related Art

In an operating device described in Japanese Patent Application Laid-Open (JP-A) No. 2010-522116, an anchoring pin of a selector lever is placed by biasing force in anchoring recesses of an anchoring track and on a tip track of an anchoring guide member, so as to retain the selector lever at a shift position.

Moreover, after the anchoring pin is moved from an anchoring recess of the anchoring guide member onto a return guide track due to an actuator moving the anchor guide member at a specific occasion and after the anchoring pin has been moved along the return guide track, the anchoring pin is then moved from the return guide track into another of the anchoring recesses, so as to change the shift position of the selector lever.

In such an operating device, the actuator moves the anchoring guide member. The anchoring recesses are provided as recessed shapes to the bottom faces of the anchoring track and the tip track.

SUMMARY

In consideration of the above circumstances, the present disclosure provides a shift device capable of easily changing a shift position of a shift body at a specific occasion.

A shift device of a first aspect of the present disclosure includes: a shift body that is operated to change a shift position thereof; a biasing section that causes biasing force to act on the shift body; a retention track that by placement of the biasing section thereon causes the shift body to be retained at a shift position; a release track that by movement of the biasing section thereon from the retention track causes retention of the shift body at a shift position to be released; and a changer section that, after the biasing section has been made movable and the biasing section has been moved from the retention track to the release track at a specific occasion and been moved along the release track, causes the biasing section to be moved from the release track onto the retention track and a shift position of the shift body to be changed.

A shift device of a second aspect of the present disclosure includes: a shift body that is operated to change a shift position thereof; a biasing section that causes biasing force to act on the shift body; a retention track that is provided with a plurality of indentation shaped retention portions, the shift body being retained at a shift position by the biasing section being placed in the plurality of retention portions; a release track that is provided with a release face continuing smoothly from bottom faces of the retention portions, and on which retention of the shift body at a shift position is released by the biasing section being moved onto the release face from the retention portions; and a changer section that, after the biasing section has been moved from the retention portions onto the release face and moved along the release face, causes the biasing section to be moved from the release face to the retention portions and a shift position of the shift body to be changed by moving at a specific occasion at least one of the biasing section, or the retention track and the release track.

A shift device of a third aspect of the present disclosure is the shift device of the first aspect or the second aspect, further including a release biasing section that is provided to the changer section, and that employs biasing force to move the biasing section from the retention track onto the release track.

A shift device of a fourth aspect of the present disclosure is the shift device of any one of the first aspect to the third aspect, wherein the retention track and the release track are disposed so as to be adjacent and parallel to each other.

A shift device of a fifth aspect of the present disclosure is the shift device of any one of the first aspect to the fourth aspect, further including a restriction member that by engaging with the shift body and limiting movement along at least one of the retention track or the release track, restricts operation of the shift body and restrict change in a shift position of the shift body.

In the shift device of the first aspect of the present disclosure, the shift body is operated and the shift position of the shift body is changed. Moreover, the shift body is retained at a shift position by the biasing section causing biasing force to act on the shift body and the biasing section being placed on the retention track.

Moreover, retention of the shift body at a shift position is released by the biasing section moving from the retention track onto the release track.

When doing so, by the changer section moving the biasing section at a specific occasion, the biasing section is moved from the release track onto the retention track and the shift position of the shift body is changed after the biasing section has been moved from the retention track to the release track and been moved along the release track.

Thus it is sufficient that the changer section causes the biasing section to move, thereby enabling the shift position of the shift body to be easily changed.

In the shift device of the second aspect of the present disclosure, the shift body is operated and the shift position of the shift body is changed. Moreover, the biasing section causes biasing force to act on the shift body, and the shift body is retained at a shift position by placement of the biasing section in retention portions of the retention track.

Retention of the shift body at a shift position is released by the biasing section being moving from the respective retention portion onto the release face of the release track.

Moreover, by the changer section moving at least one out of the biasing section, or the retention track and the release track at a specific occasion, the biasing section is moved from the release face to the respective retention portion and the shift position of the shift body is changed after the biasing section has been moved from the respective retention portion onto the release face and been moved along the release face.

Note that the release face continues smoothly from the bottom faces of the retention portions. Thus, the biasing section can be easily moved from the retention portion to the release face, enabling the shift position of the shift body to be easily changed.

In the shift device of the third aspect of the present disclosure, the release biasing section is provided to the changer section, and the release biasing section employs biasing force to move the biasing section from the retention track onto the release track. This enables the biasing section to be moved from the retention portion onto the release track with a simple configuration.

In the shift device of the fourth aspect of the present disclosure, the retention track and the release track are disposed so as to be adjacent and parallel to each other. Thus, the movement amount of the biasing section between the retention track and the release track, and along the release track can be made small, enabling the shift position of the shift body to be changed even more easily.

In the shift device of the fifth aspect of the present disclosure, the restriction member engages with the shift body so as to restrict operation of the shift body and restrict change in the shift position of the shift body.

The restriction member limits movement along at least one out of the retention track or the release track. Thus, operation of the shift body can be effectively restricted when the restriction member is engaged with the shift body.

BRIEF DESCRIPTION OF THE DRAWINGS

Exemplary embodiments of the present disclosure will be described in detail based on the following figures, wherein.

DETAILED DESCRIPTION

Figure 1:
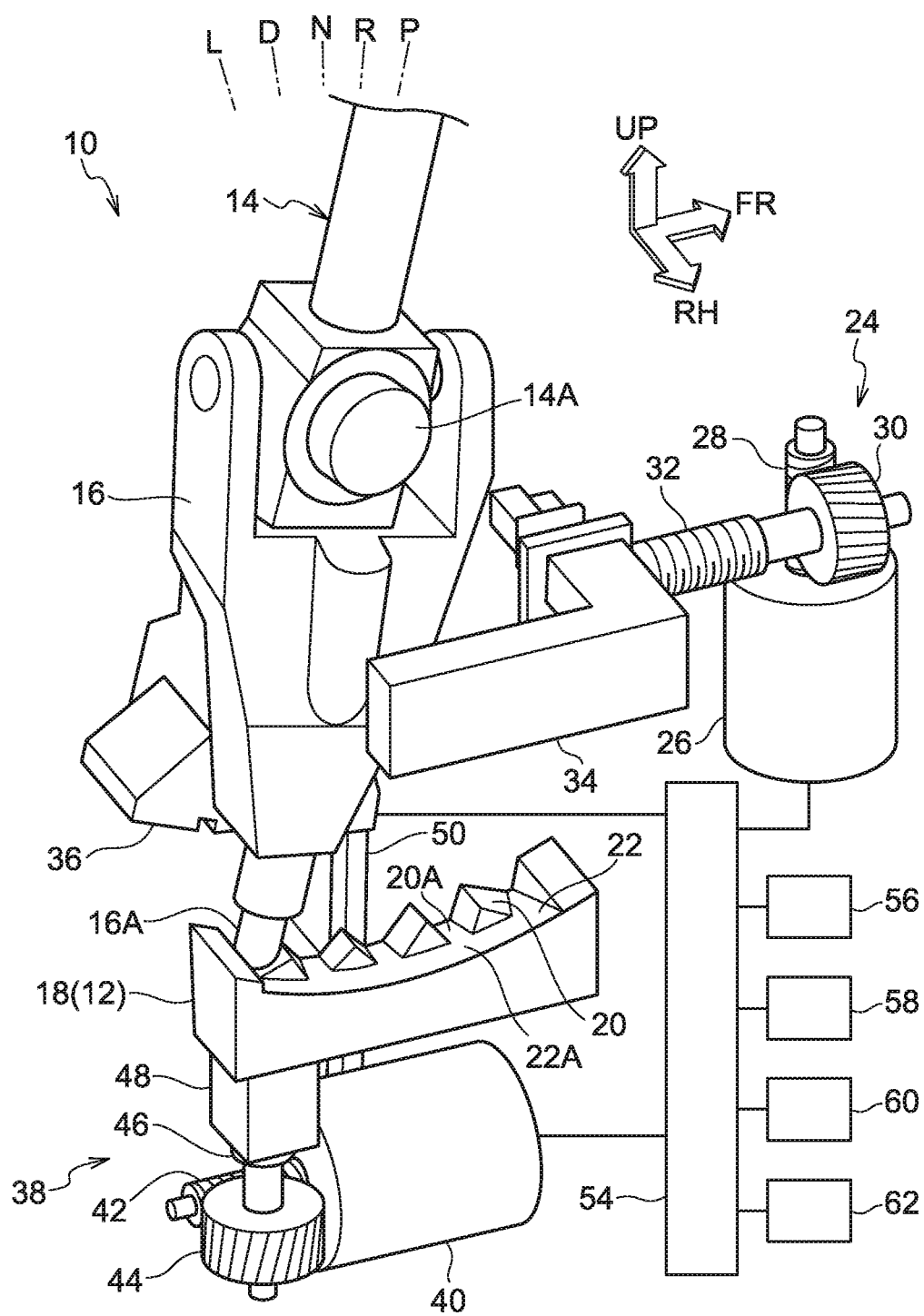
FIG. 1 is a perspective view of a shift lever device according to an exemplary embodiment of the present disclosure when a shift lever is placed at a P position, as viewed obliquely from the rear right.
Figure 6:
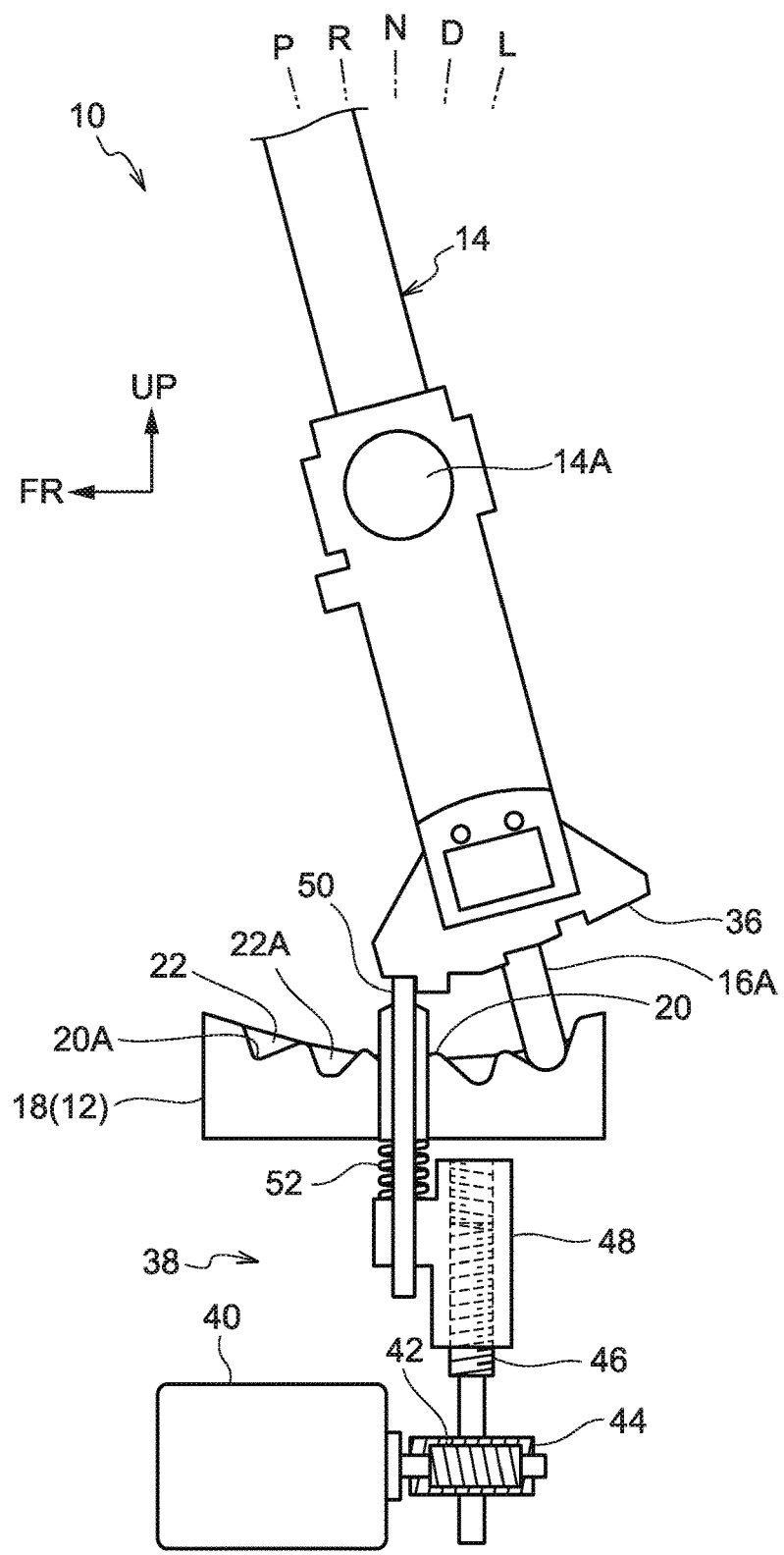
FIG. 6 is a side view of a shift lever device according to an exemplary embodiment of the present disclosure when a shift lever is placed at a P position, as viewed from the left.

FIG. 1 is a perspective view illustrating a shift lever device 10 serving as a shift device according to an exemplary embodiment of the present disclosure, as viewed obliquely from the rear right, and FIG. 6 is a side view illustrating the shift lever device 10 as viewed from the left. Note that in the drawings, the arrow FR indicates the front of the shift lever device 10, the arrow RH indicates the right of the shift lever device 10, and the arrow UP indicates the upper side of the shift lever device 10.

The shift lever device 10 according to the present exemplary embodiment is what is called a straight type shift device. The shift lever device 10 is floor-mounted and installed at a floor section of a vehicle cabin at the vehicle width direction inside of a driver seat (not illustrated in the drawings) of a vehicle (automobile). The front, left, and upper side of the shift lever device 10 respectively face the front, left, and upper side of the vehicle.

As illustrated in FIG. 1 and FIG. 6, the shift lever device 10 is provided with a resin, substantially rectangular box shaped housing 12 (plate) serving as a support body. The housing 12 is fixed to the floor section of the vehicle cabin, and the shift lever device 10 is installed to the floor section of the vehicle cabin.

A substantially elongated rod shaped shift lever 14, serving as a shift body, is disposed inside the housing 12, and circular column shaped support shafts 14A are coaxially provided to a left face and a right face of an up-down intermediate portion of the shift lever 14. The pair of support shafts 14A of the shift lever 14 are supported inside the housing 12 so as to be capable of swinging, and the shift lever 14 extends out from the housing 12 toward the upper side. A knob (not illustrated in the drawings) serving as a grip portion is provided to an upper end portion (leading end portion) of the shift lever 14, and the shift lever 14 is capable of being swing-operated in the front-rear direction in a state in which an occupant of the vehicle (particularly the driver) has gripped the knob. Accordingly, the shift lever 14 is capable of swinging to a P position (a park position, a specific shift position), an R position (a reverse position), an N position (a neutral position), a D position (a drive position), and an L position (a low position), serving as shift positions on progression from the front side to the rear side. A button (not illustrated in the drawings), serving as an operation section, is provided to the knob, and the button is capable of being operated by the occupant.

An upper end of a biasing link 16, having substantially an inverted triangular plate shape in face-on view and serving as a biasing section, is supported by the up-down direction intermediate portion of the shift lever 14, and the biasing link 16 is disposed on the right side of the shift lever 14. The biasing link 16 is capable of swinging integrally with the shift lever 14 in the front-rear direction, and the biasing link 16 is capable of swinging in the left-right direction with respect to the shift lever 14. A changer spring (a torsion coil spring, not illustrated in the drawings) serving as a release biasing section configuring a changer section, spans between the shift lever 14 and the biasing link 16, and the coil spring biases the biasing link 16 to the right side with respect to the shift lever 14.

A substantially circular column shaped indexing pin 16A, serving as a biasing member, is supported by a lower end portion of the biasing link 16. The indexing pin 16A is capable of moving in the axial direction (substantially in the up-down direction) with respect to the biasing link 16. The indexing pin 16A projects out from the biasing link 16 toward the lower side, and a lower end face of the indexing pin 16A is curved in a spherical face shape. An indexing spring (compression coil spring, not illustrated in the drawings), serving as a retention bias section, spans between the indexing pin 16A and the biasing link 16, and the indexing spring biases the indexing pin 16A toward the lower side with respect to the biasing link 16.

A substantially rectangular shaped indexing block 18, serving as a retention member, is integrally provided inside the housing 12 at the lower side of the indexing pin 16A, and the indexing block 18 is elongated along the front-rear direction. A retention track 20 (indexing track) is provided on the left side of an upper face of the indexing block 18, and the retention track 20 is elongated along the front-rear direction. Plural recesses 20A (five in the present exemplary embodiment), having inverted trapezoidal cross-section profiles and serving as retention portions, are provided along the retention track 20. The plural recesses 20A are arrayed along the front-rear direction and respectively open toward the upper side and the right side. The right side of the upper face of the indexing block 18 is provided with a release track 22. The release track 22 is elongated along the front-rear direction, and a lower face (bottom face) of the release track 22 is configured by a release face 22A. The release face 22A is flush with lower faces (bottom faces) of the recesses 20A of the retention track 20 and connected smoothly to the lower faces of the recesses 20A. The lower faces of the recesses 20A and the release face 22A are smoothly inclined in an upward direction on progression toward the right, and are smoothly inclined in a downward direction on progression toward the rear.

A changer mechanism 24 configuring a changer section is provided inside the housing 12 at the front side of the shift lever 14 and the biasing link 16. The changer mechanism 24 is provided with a changer motor 26 serving as a changer drive section, and the changer motor 26 is fixed to the inside of the housing 12. A changer worm 28 configuring a changer transmission section is fixed coaxially to an output shaft of the changer motor 26, and a changer worm wheel 30 configuring a changer transmission section meshes with the changer worm 28. A changer screw 32 configuring a changer transmission section is fixed coaxially to the changer worm wheel 30. The changer screw 32 is supported inside the housing 12 so as to be capable of rotating. The changer screw 32 extends out from the changer worm wheel 30 toward the rear, and the changer screw 32 screws together with and pierces through a front side portion of a changer bar 34 having an L shaped plate shape in cross-section profile and serving as a changer member. The changer bar 34 is limited from swinging about the changer screw 32 inside the housing 12. The changer bar 34 is capable of moving in the front-rear direction. A rear side portion of the changer bar 34 extends in the front-rear direction and is disposed at the right side of the biasing link 16. The rear side portion of the changer bar 34 limits the biasing link 16 from swinging toward the right side under biasing force from the changer spring.

The indexing pin 16A of the biasing link 16 is thereby placed on the retention track 20 of the indexing block 18, and, in order to place the shift lever 14 at a shift position, biasing force from the indexing spring is employed to place the indexing pin 16A in the respective recess 20A of the retention track 20, such that the shift lever 14 is retained in the respective shift position. When the shift lever 14 is swing-operated, the indexing pin 16A is moved out from a recess 20A against biasing force from the indexing spring, and biasing force from the indexing spring is employed to insert the indexing pin 16A into other recesses 20A, thereby imparting a click feeling to swing-operation of the shift lever 14.

A detent groove 36 serving as a restriction section is formed at a lower end of the shift lever 14. The detent groove 36 is formed with specific indentations and projections along the front-rear direction, and is open toward the lower side and both left and right direction sides.

A restriction mechanism 38 configuring a restriction section is provided inside the housing 12 at the lower side of the shift lever 14. The restriction mechanism 38 is provided with a restriction motor 40 serving as a restriction drive section, and the restriction motor 40 is fixed to the inside of the housing 12. A restriction worm 42 configuring a restriction transmission section is fixed coaxially to an output shaft of the restriction motor 40, and a restriction worm wheel 44 configuring a changer transmission section meshes with the restriction worm 42. A restriction screw 46 configuring a changer transmission section is fixed coaxially to the restriction worm wheel 44. The restriction screw 46 is supported inside the housing 12 so as to be capable of rotating. The restriction screw 46 extends out upward from the restriction worm wheel 44, and the restriction screw 46 screws with the inside of a substantially tube shaped restriction tube 48, serving as a support member. A substantially rectangular plate shaped detent pin 50, serving as a restriction member, is supported by the restriction tube 48. The detent pin 50 extends out upward from the restriction tube 48, and is disposed perpendicular to the front-rear direction. The detent pin 50 is supported inside the housing 12 from both front and rear direction sides, on the left side of the indexing block 18. Thus, swinging of the restriction tube 48 and the detent pin 50 about the restriction screw 46 is limited. The detent pin 50 is capable of moving in the up-down direction with respect to the restriction tube 48. A restriction spring 52 (coil spring), serving as a biasing section restrictor, spans between the restriction tube 48 and the detent pin 50. The detent pin 50 engages with the detent groove 36 of the shift lever 14 under biasing force from the compressed restriction spring 52. Accordingly, swinging of the shift lever 14 from the P position to the R position is restricted (locked), and specific swinging from a specific shift position of the shift lever 14 (swinging from the D position to the L position, swinging from the D position to the N position, swinging from the N position to the R position, and swinging from the R position to the P position) is restricted (locked).

The shift lever 14 is electrically connected to a vehicle controller 54, and a vehicle transmission 56 (automatic transmission) is electrically connected to the controller 54. Accordingly, by changing the shift position of the shift lever 14 to the P position, the R position, the N position, the D position, or the L position, the shift range of the vehicle transmission 56 is respectively changed to a P range (parking range, a specific range), an R range (reverse range), an N range (neutral range), a D range (drive range), or an L range (low range) under control of the controller 54.

The changer motor 26 and the restriction motor 40 are electrically connected to the controller 54, and the button of the shift lever 14 is electrically connected to the controller 54. A vehicle brake 58 is electrically connected to the controller 54, and the occupant brakes the vehicle by operating the brake 58.

A vehicle engine 60 and a switch 62 (engine start/stop switch), serving as a changer operation section, are electrically connected to the controller 54, and the switch 62 is capable of being operated by the occupant. The vehicle engine 60 is started under control of the controller 54 when the switch 62 is operated in a stopped state of the vehicle engine 60. The vehicle engine 60 is stopped under control of the controller 54, however, when the switch 62 is operated in a state in which the vehicle engine 60 is running.

Next, explanation follows regarding operation of the present exemplary embodiment.

In the shift lever device 10 configured as described above, when the switch 62 is operated and the vehicle engine 60 is started under control of the controller 54, the shift lever 14 is placed at the P position and the vehicle transmission 56 is placed in the P range. The biasing force of the indexing spring is employed to place the indexing pin 16A of the biasing link 16 in the respective recess 20A of the retention track 20 of the indexing block 18.

In the state in which the shift lever 14 has been placed at the P position, and when at least one applies out of the brake 58 not being operated, or the button (knob) of the shift lever 14 not being operated, as illustrated in FIG. 1 and FIG. 6, the detent pin 50 is engaged with the detent groove 36 of the shift lever 14 under the biasing force from the compressed restriction spring 52. Thus, swing-operation of the shift lever 14 from the P position is restricted.

Figure 7:
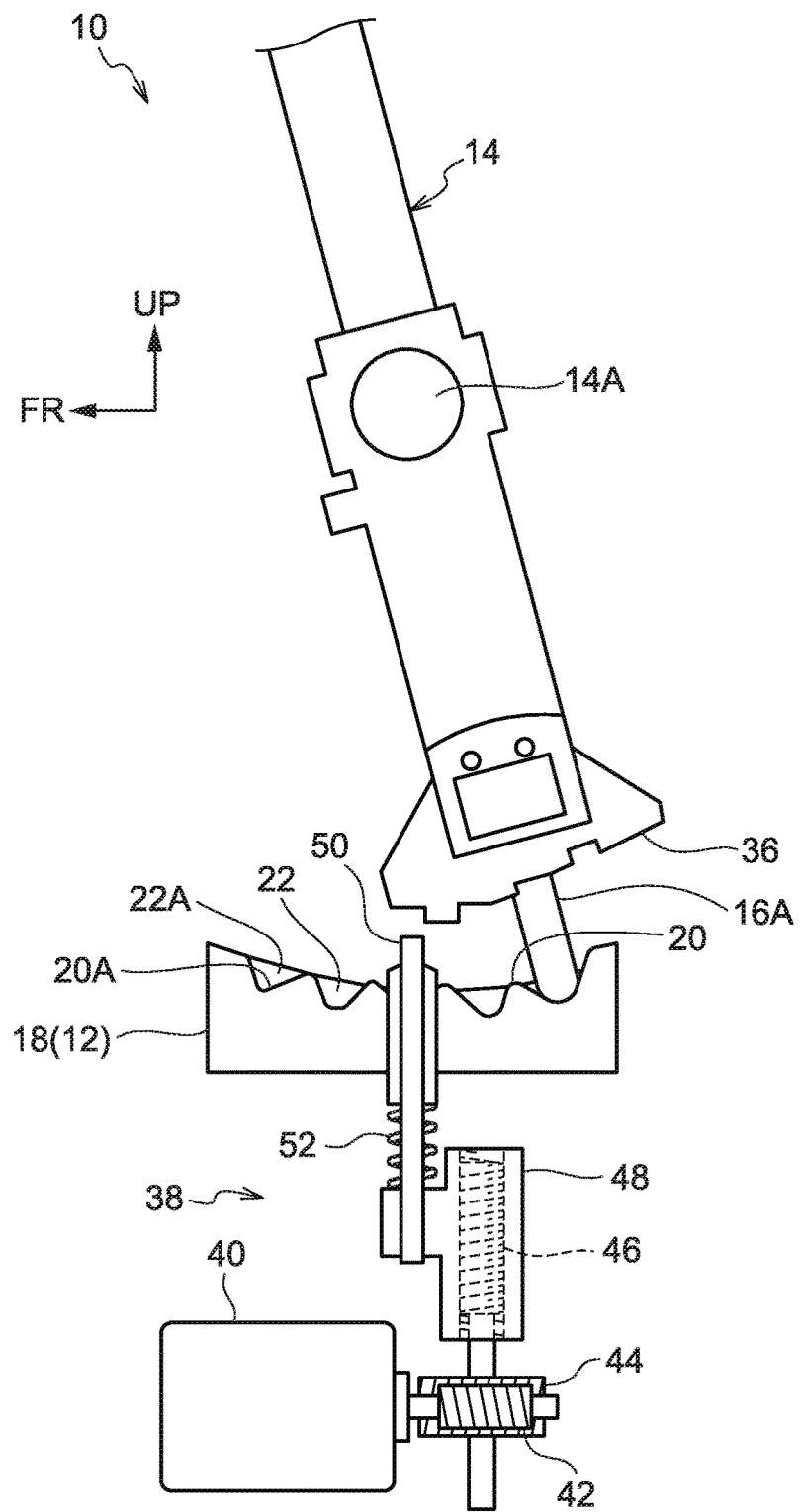
FIG. 7 is a side view of a shift lever device according to an exemplary embodiment of the present disclosure when a shift lever is swing-operated from a P position, as viewed from the left.
Figure 8:
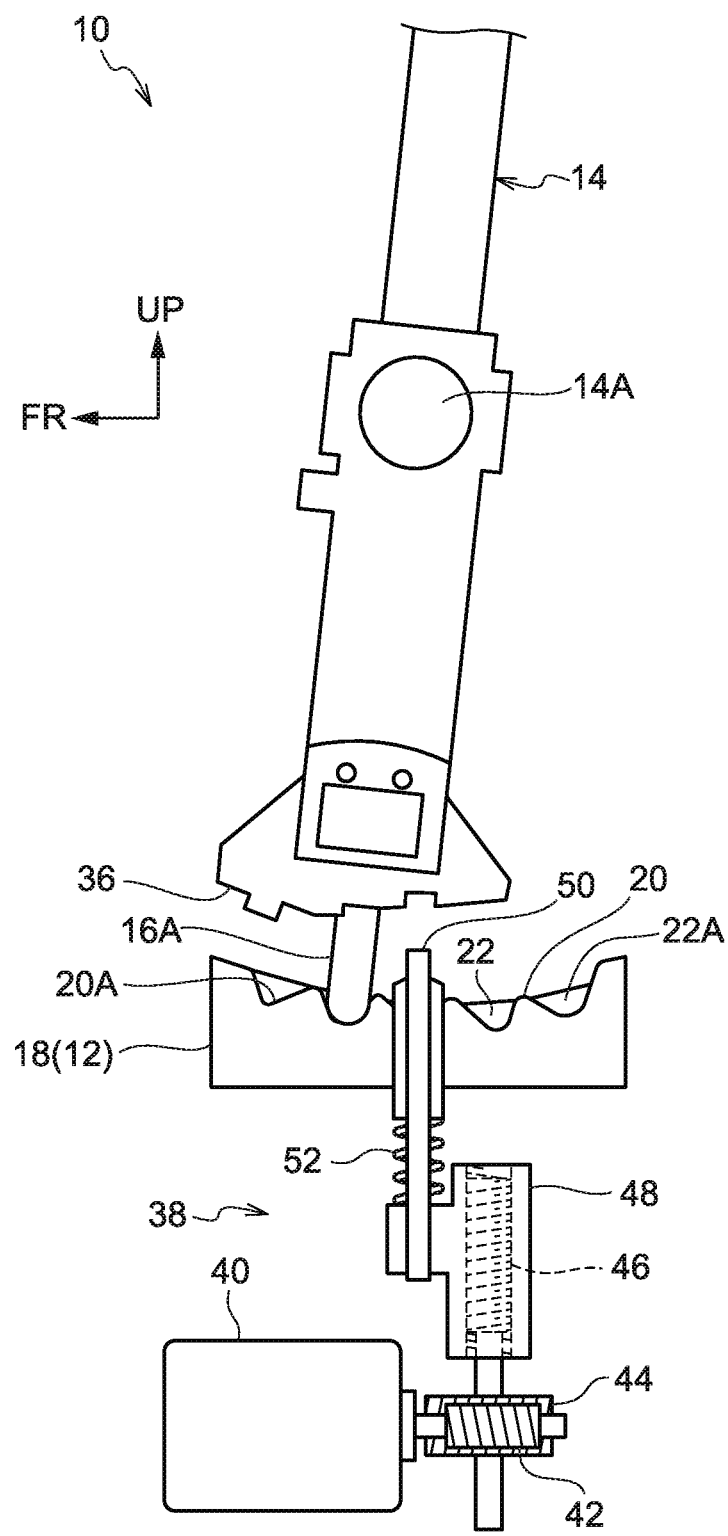
FIG. 8 is a side view of a shift lever device according to an exemplary embodiment of the present disclosure when a shift lever is swing-operated from a D position, as viewed from the left.

However, in the state in which the shift lever 14 has been placed at the P position, when the brake 58 is operated and the button of the shift lever 14 is also operated, as illustrated in FIG. 7, in the restriction mechanism 38, the restriction motor 40 is forward-driven under control of the controller 54, and the restriction worm 42, the restriction worm wheel 44, and the control screw 46 are forward-rotated, moving the restriction tube 48 to the lower side and releasing compression of the restriction spring 52, and thereby moving the detent pin 50 to the lower side. Engagement of the detent pin 50 with the detent groove 36 is thereby released, and the shift lever 14 is thereby permitted to be swing-operated from the P position. Accordingly, as illustrated in FIG. 8, for example, by swing-operating the shift lever 14 from the P position, the shift position of the shift lever 14 is changed from the P position, and the shift range of the vehicle transmission 56 is changed from the P range under control of the controller 54.

When the shift lever 14 is swing-operated, the indexing pin 16A of the biasing link 16 moves out from the recess 20A of the retention track 20 of the indexing block 18 against the biasing force from the indexing spring. A click feeling is imparted when swing-operating the shift lever 14 due to the indexing pin 16A being inserted into recesses 20A under biasing force from the indexing spring. Moreover, when the shift lever 14 is placed at a shift position, the indexing pin 16A is placed in the respective recess 20A under biasing force from the indexing spring, such that the shift lever 14 is retained in the respective shift position.

In a state in which the shift lever 14 has been placed at a shift position, when operation of the button of the shift lever 14 is released, the restriction motor 40 is reverse-driven under control of the controller 54, and the restriction worm 42, the restriction worm wheel 44, and the control screw 46 are reverse-rotated, moving the restriction tube 48 and the detent pin 50 toward the upper side, such that the detent pin 50 engages with the detent groove 36 while the restriction spring 52 is compressed.

Figure 2:
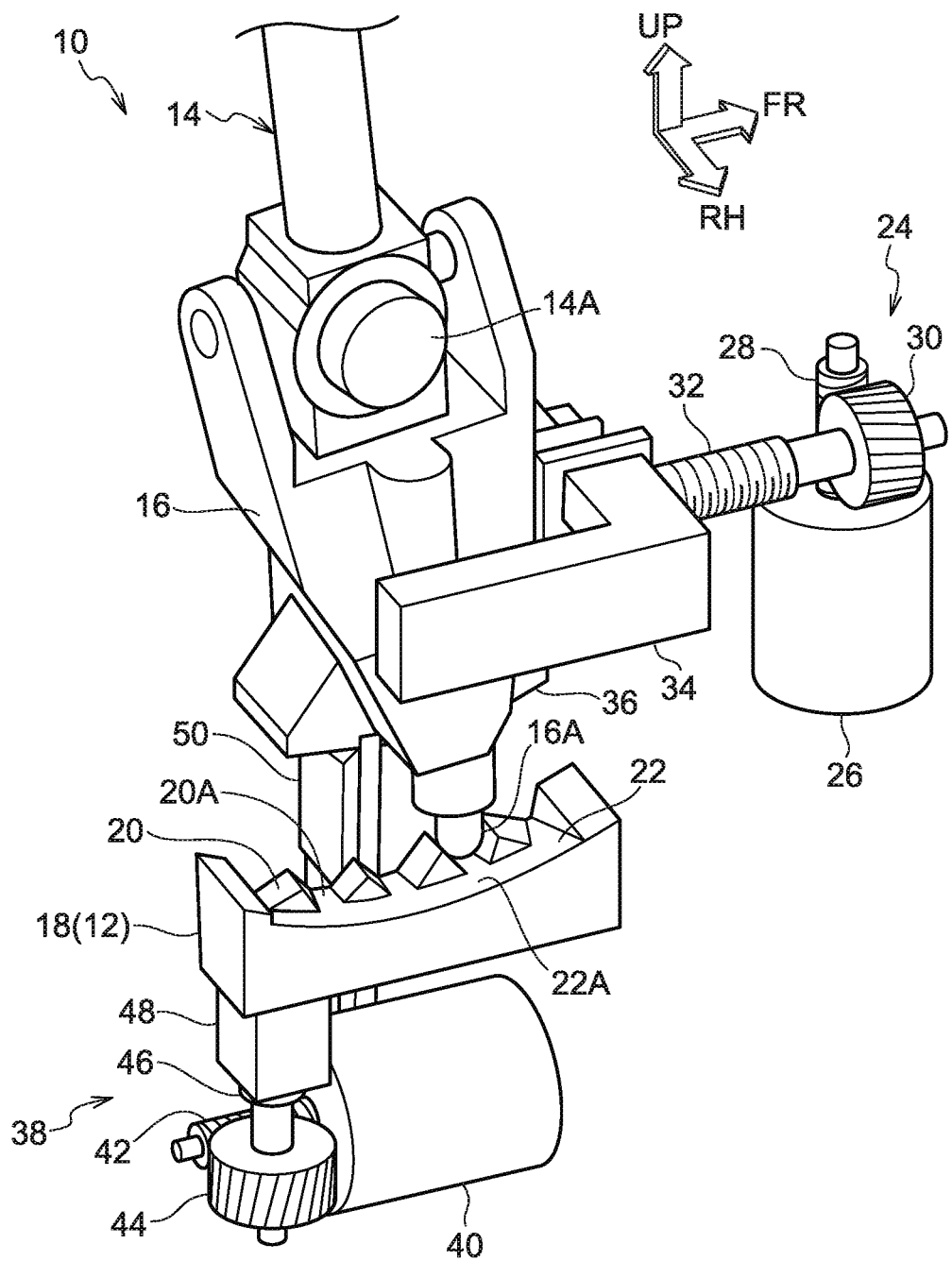
FIG. 2 is a perspective view of a shift lever device according to an exemplary embodiment of the present disclosure when a shift lever device is placed at a D position, as viewed obliquely from the rear right.
Figure 9:
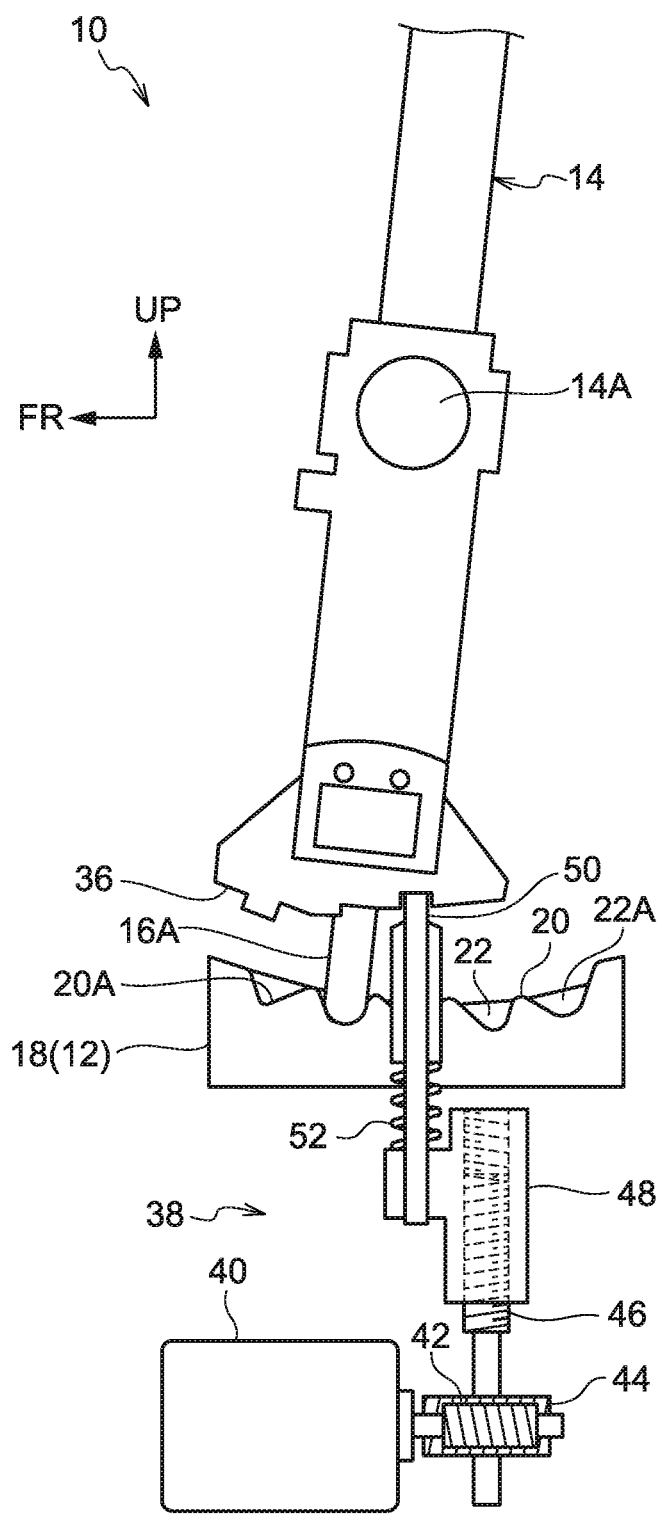
FIG. 9 is a side view of a shift lever device according to an exemplary embodiment of the present disclosure when a shift lever is placed at a D position, as viewed from the left.

In the state in which the shift lever 14 has been placed at a specific shift position other than the P position, when the button of the shift lever 14 is not operated, as illustrated in FIG. 2 and FIG. 9, for example, the detent pin 50 engages with the detent groove 36 of the shift lever 14 under biasing force from the compressed restriction spring 52. Thus, specific swing-operations of the shift lever 14 from the specific shift position are restricted.

On the other hand, in the state in which the shift lever 14 has been placed at a specific shift position other than the P position, when the button of the shift lever 14 is operated, as illustrated in FIG. 8, for example, the restriction motor 40 is forward-driven under control of the controller 54, and the restriction worm 42, the restriction worm wheel 44, and the control screw 46 are forward-rotated. Thus, the restriction tube 48 moves toward the lower side and the compression of the restriction spring 52 is released, thereby moving the detent pin 50 toward the lower side. Thus, the engagement of the detent pin 50 with the detent groove 36 is released, such that a specific swing-operation of the shift lever 14 from the specific shift position is permitted. A specific swing-operation of the shift lever 14 from the specific shift position changes the shift position of the shift lever 14 from the specific shift position, thereby changing the shift range of the vehicle transmission 56 from a specific shift range under control of the controller 54.

Note that, in the state in which the shift lever 14 has been placed at a shift position other than the P position, when the switch 62 is operated and the vehicle engine 60 is stopped under control of the controller 54 (a specific occasion), the shift range of the vehicle transmission 56 is changed to the P range under control of the controller 54.

Figure 3:
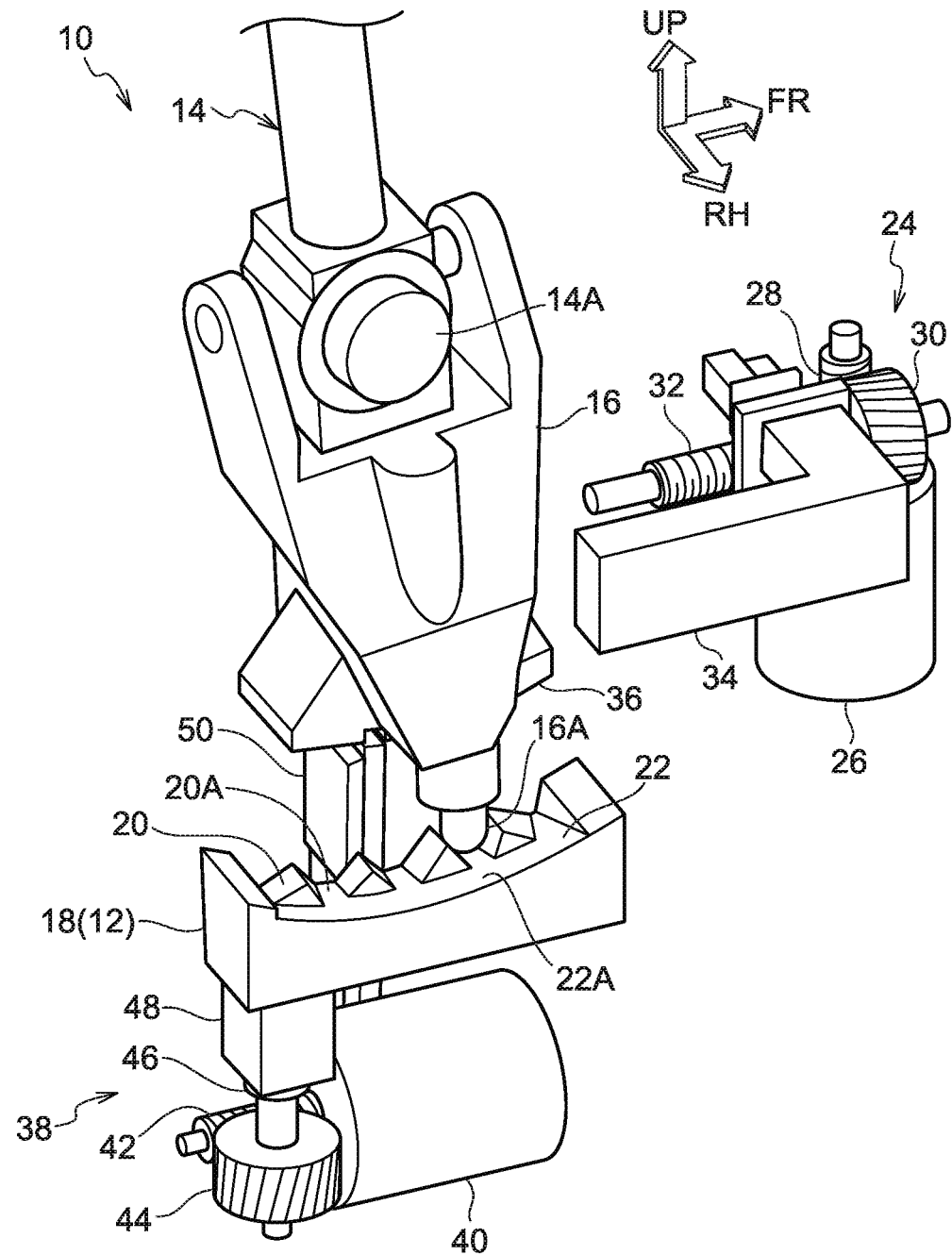
FIG. 3 is a perspective view of a shift lever device according to an exemplary embodiment of the present disclosure illustrating a first stage of a shift lever returning to a P position, as viewed obliquely from the rear right.

When this is performed, as illustrated in FIG. 3 and FIG. 8, for example, the restriction motor 40 is forward-driven under control of the controller 54, and the restriction worm 42, the restriction worm wheel 44, and the control screw 46 are forward-rotated such that the restriction tube 48 moves toward the lower side and compression of the restriction spring 52 is released, thereby moving the detent pin 50 toward the lower side. Thus, engagement of the detent pin 50 in the detent groove 36 is released, permitting swinging of the shift lever 14 from the shift position other than the P position.

Figure 4:
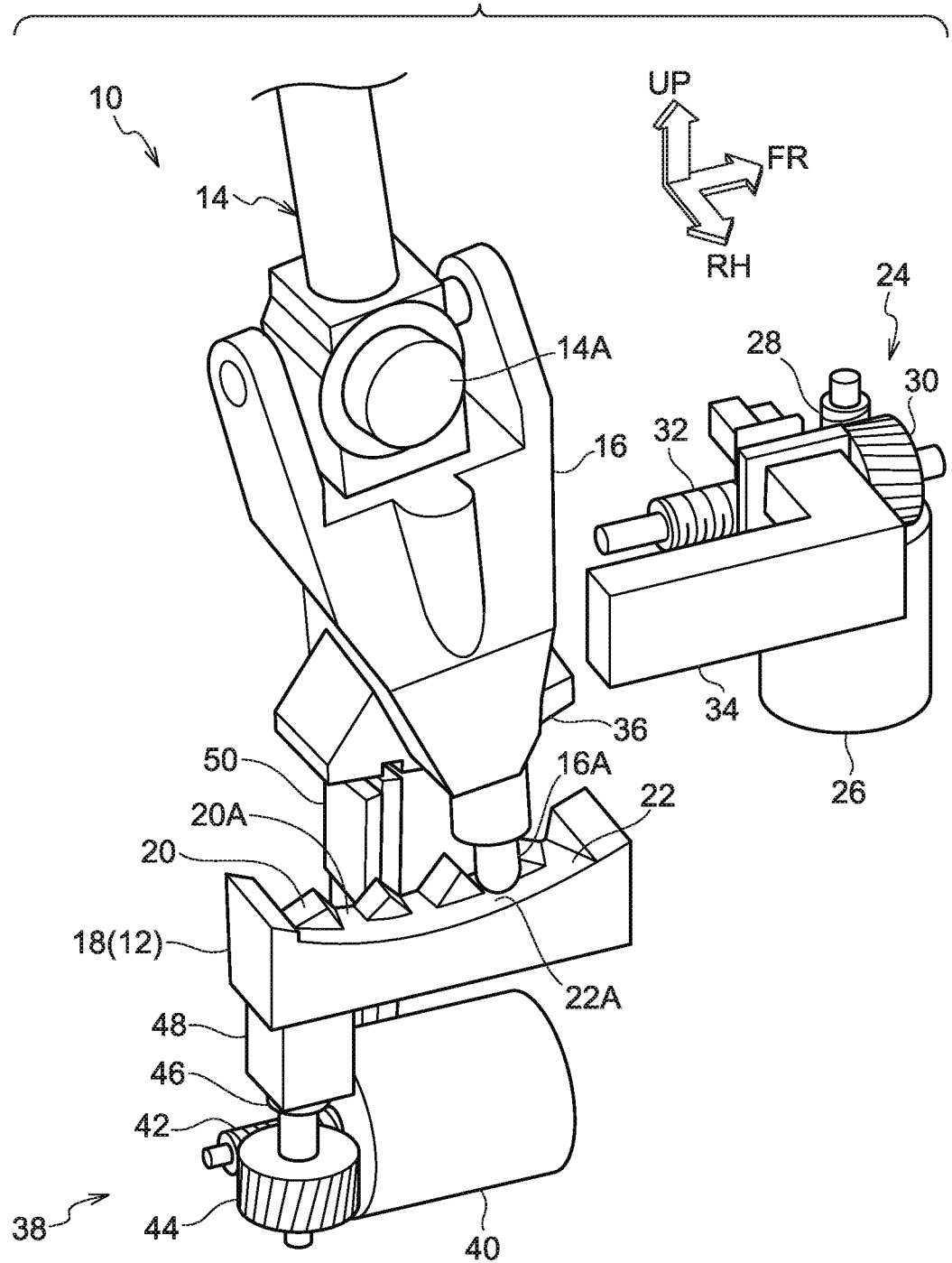
FIG. 4 is a perspective view of a shift lever device according to an exemplary embodiment of the present disclosure illustrating a second stage of a shift lever returning to a P position, as viewed obliquely from the rear right.
Figure 5:
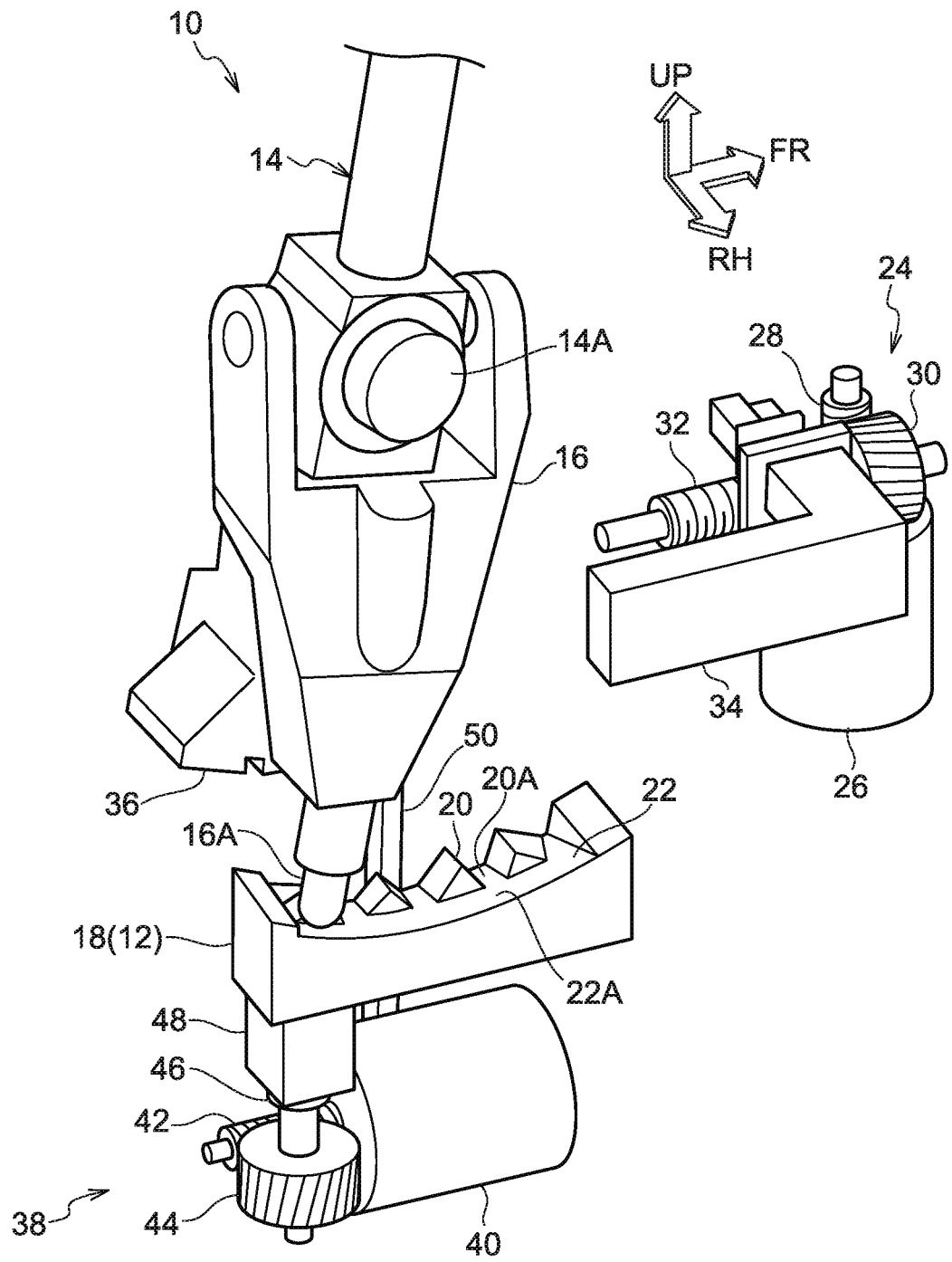
FIG. 5 is a perspective view of a shift lever device according to an exemplary embodiment of the present disclosure illustrating a third stage of a shift lever returning to a P position, as viewed obliquely from the rear right.

Moreover, in the changer mechanism 24, the changer motor 26 is forward-driven under control of the controller 54, and the changer worm 28, the changer worm wheel 30, and the changer screw 32 are forward-rotated, thereby moving the changer bar 34 toward the front side and placement of the rear side portion of the changer bar 34 on the right side of the biasing link 16 is released. Thus, as illustrated in FIG. 4, for example, the biasing link 16 swings toward the right side under biasing force from the changer spring, thereby moving the indexing pin 16A of the biasing link 16 out from the respective recess 20A of the retention track 20 of the indexing block 18 onto the release face 22A of the release track 22. Accordingly, as illustrated in FIG. 5, the indexing pin 16A is moved toward the rear side of the release face 22A under biasing force from the indexing spring, the biasing link 16 is thereby swung toward the rear side, and the shift lever 14 is swung integrally with the biasing link 16 toward the front side to the P position.

Then, as illustrated in FIG. 7, the changer motor 26 is reverse-driven under control of the controller 54, and the changer worm 28, the changer worm wheel 30, and the changer screw 32 are reverse-rotated, moving the changer bar 34 toward the rear side and placing the rear side portion of the changer bar 34 on the right side of the biasing link 16. Thus, the biasing link 16 is swung against the biasing force of the changer spring toward the left side by the rear side portion of the changer bar 34, such that the indexing pin 16A of the biasing link 16 is moved from the release face 22A of the release track 22 of the indexing block 18 into the respective recess 20A of the retention track 20.

Moreover, as illustrated in FIG. 1 and FIG. 6, the restriction motor 40 is reverse-driven under control of the controller 54, and the restriction worm 42, the restriction worm wheel 44, and the control screw 46 are reverse-rotated such that the restriction tube 48 and the detent pin 50 are moved toward the upper side, and the detent pin 50 engages with the detent groove 36 while the restriction spring 52 is compressed.

Accordingly, in a state in which shift lever 14 has been placed at a shift position other than the P position, the shift position of the shift lever 14 can be returned (can be changed) to the P range automatically, and the shift position of the shift lever 14 and the specific range of the vehicle transmission 56 can be matched to each other, even when the switch 62 is operated (when the shift range of the vehicle transmission 56 has been changed to the P shift range) while the vehicle engine 60 is stopped.

In order to return the shift position of the shift lever 14 to the P position automatically, the changer mechanism 24, the changer spring, and the indexing spring move the shift lever 14 and the biasing link 16. Thus, in contrast to cases in which the indexing block 18 is configured so as to be capable of moving and the indexing block 18 is moved, the shift position of the shift lever 14 can be easily returned to the P position. Moreover, this enables provision of moving space for the indexing block 18 to be rendered unnecessary, enabling the shift lever device 10 to be made more compact.

Moreover, in the indexing block 18, the release face 22A of the release track 22 continues smoothly from the lower faces of the recesses 20A of the retention track 20. Thus, when the shift position of the shift lever 14 is returned to the P position automatically, the indexing pin 16A of the biasing link 16 can easily move from the lower face of the respective recess 20A to the release face 22A, enabling the shift position of the shift lever 14 to be returned to the P position even more easily.

In order to return the shift position of the shift lever 14 to the P position automatically, the biasing force from the changer spring is employed to move the indexing pin 16A of the biasing link 16 from the lower face of the respective recess 20A to the release face 22A. This enables the indexing pin 16A to be moved from the lower face of the respective recess 20A to the release face 22A with a simple configuration. Moreover, this enables the need for the changer mechanism 24 to move the indexing pin 16A from the lower face of the respective recess 20A to the release face 22A to be eliminated, enabling configuration of the changer mechanism 24 to be simplified.

In the indexing block 18, the retention track 20 and the release track 22 are disposed so as to be adjacent and parallel to each other. Thus, in order to return the shift position of the shift lever 14 to the P position automatically, the movement amount of the indexing pin 16A between the retention track 20 (recesses 20A) and the release track 22 (release face 22A), and along the release track 22 (release face 22A), can be reduced, thereby enabling the shift position of the shift lever 14 to be returned to the P position even more easily. Moreover, the space for disposing the retention track 20 and the release track 22 can be made smaller, enabling the indexing block 18 to be made more compact, and thereby enabling the shift lever device 10 to be made even more compact.

The detent pin 50 is supported inside the housing 12 from both front-rear direction sides, and the indexing block 18 (the retention track 20 and the release track 22) is integrally provided inside the housing 12. Thus, even when swing-operation force in the front-rear direction acts on the shift lever 14 in a state in which the detent pin 50 has engaged with the detent groove 36 of the shift lever 14, the movement force (tilting force) in the front-rear direction, acting on the detent pin 50 through the detent groove 36, is supported inside the housing 12 (including the indexing block 18). Accordingly, movement of the detent pin 50 in the front-rear direction can be effectively limited, enabling the swing-operation of the shift lever 14 in the front-rear direction to be effectively restricted.

The dimension from the support shafts 14A (a line through the swing center thereof) of the shift lever 14 to the detent groove 36 is made larger according to the dimension from the support shafts 14A (a line through the swing center thereof) of the shift lever 14 to the knob (the position where swing-operation force acts) (for example, is made larger in proportion to the dimension from the support shafts 14A of the shift lever 14 to the knob). Thus, even when swing-operation force acts on the shift lever 14 in a state in which the detent pin 50 is engaged with the detent groove 36 of the shift lever 14, friction force between the detent pin 50 and the detent groove 36 can be made smaller, enabling a reduction in the load to move the detent pin 50 toward the lower side. Accordingly, the restriction motor 40 can be forward-driven under control of the controller 54, and the detent pin 50 can be moved toward the lower side, thereby enabling the engagement of the detent pin 50 with the detent groove 36 to be released, and enabling swing-operation of the shift lever 14 to be permitted.

The button of the knob of the shift lever 14 is electrically connected to the controller 54. This enables the need to mechanically connect the button to the detent groove 36 or the detent pin 50 to be eliminated, enabling placement space for a mechanism provided to the knob to be reduced, enabling the number of components of the mechanism to be reduced, and thereby enabling a reduction in the component costs and assembly costs of the knob.

Note that in the present exemplary embodiment, the shift lever 14 and the biasing link 16 are moved when the shift position of the shift lever 14 is returned to the P position automatically. However, the indexing block 18 may be moved when returning the shift position of the shift lever 14 to the P position automatically.

Moreover, in the present exemplary embodiment, the shift lever 14 is moved to the P position automatically at a specific occasion. However, the shift lever 14 may be moved automatically to a shift position other than the P position at a specific occasion.

In the present exemplary embodiment, the shift lever device 10 is floor-mounted and installed at a floor section of the vehicle cabin. However, the shift lever device 10 may be installed to a steering wheel column cover or an instrument panel of the vehicle cabin.

What is claimed is:

1. A shift device, comprising:
   a shift body that is operated to change a shift position thereof;
   a biasing assembly connected to the shift body that causes a biasing force to act on the shift;
   a retention track that, by placement of the biasing assembly thereon, causes the shift body to be retained at a shift position;
   a release track that, by movement of the biasing assembly thereon from the retention track, causes retention of the shift body at a shift position to be released; and
   a changer section that, after the biasing assembly has been moved from the retention track to the release track by moving in a direction that is transverse to a direction along the release track, causes the biasing assembly to be moved from the release track onto the retention track and a shift position of the shift body to be changed by moving the biasing assembly at a specific occasion,
   wherein the retention track is parallel to the release track.

2. The shift device of claim 1, further comprising a release biasing assembly that is provided to the changer section, and that employs biasing force to move the biasing assembly from the retention track onto the release track.

3. The shift device of claim 1, wherein the retention track and the release track are disposed so as to be adjacent to each other.

4. The shift device of claim 1, further comprising a restriction member that by engaging with the shift body and limiting movement along at least one of the retention track or the release track, restricts operation of the shift body and restrict change in a shift position of the shift body.

5. A shift device, comprising:
- a shift body that is operated to change a shift position thereof;
- a biasing assembly connected to the shift body that causes biasing force to act on the shift body;
- a retention track that is provided with a plurality of indentation shaped retention portions, the shift body being retained at a shift position by the biasing assembly being placed in the plurality of retention portions;
- a release track that is provided with a release face continuing smoothly from bottom faces of the retention portions, and on which retention of the shift body at a shift position is released by the biasing assembly being moved onto the release face from the retention portions, that is integrally formed with the retention track in a one-piece construction, and that directly abuts the retention track along a substantial portion of its length; and
- a changer section that, after the biasing assembly has been moved from the retention portions onto the release face and moved along the release face, causes the biasing assembly to be moved from the release face to the retention portions and a shift position of the shift body to be changed by moving at a specific occasion at least one of the biasing assembly, or the retention track and the release track.

6. The shift device of claim 5, further comprising a release biasing assembly that is provided to the changer section, and that employs biasing force to move the biasing assembly from the retention track onto the release track.

7. The shift device of claim 5, wherein the retention track and the release track are disposed so as to be adjacent and parallel to each other.

8. The shift device of claim 5, further comprising a restriction member that by engaging with the shift body and limiting movement along at least one of the retention track or the release track, restricts operation of the shift body and restricts change in a shift position of the shift body.

9. The shift device of claim 5, wherein the release track is provided constantly with the release face that continues smoothly from bottom faces of the retention portions.

10. A shift device, comprising:
- a shift body that is operated to change a shift position thereof; a biasing assembly that causes biasing force to act on the shift body;
- a retention track that, by placement of the biasing assembly thereon, causes the shift body to be retained at a shift position;
- a release track that, by movement in a direction perpendicular to a direction in which the retention track extends thereon of the biasing assembly thereon from the retention track, causes retention of the shift body at a shift position to be released; and
- a changer section that, after the biasing assembly has been moved from the retention track to the release track and moved along the release track, causes the biasing assembly to be moved in a direction perpendicular to a direction in which the release track extends thereon from the release track onto the retention track and a shift position of the shift body to be changed by moving the biasing assembly at a specific occasion.

\* \* \* \* \*